UNITED STATES PATENT OFFICE.

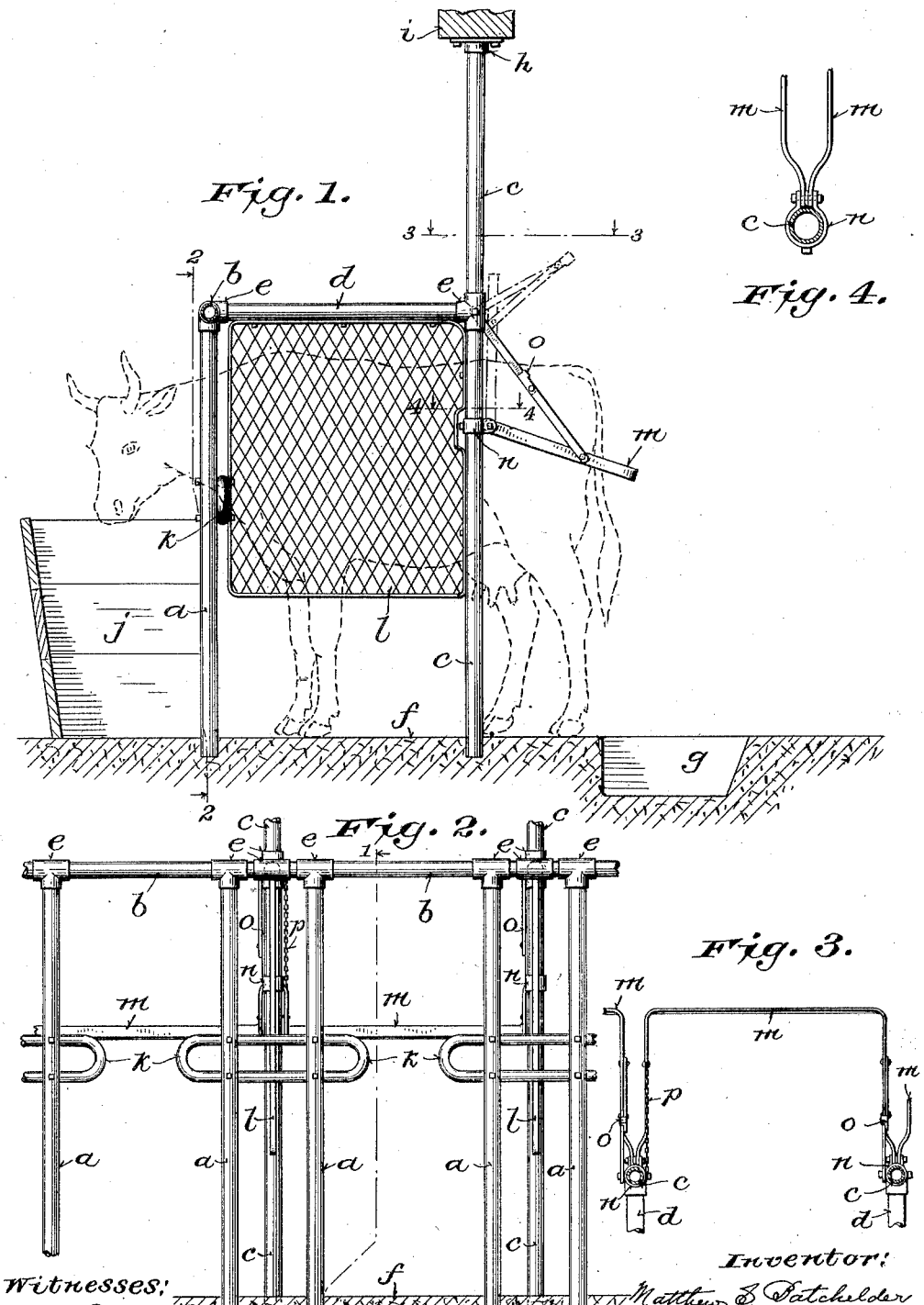

MATTHEW S. BATCHELDER, OF FOND DU LAC, WISCONSIN.

COW-STALL.

1,009,714.

Specification of Letters Patent. Patented Nov. 28, 1911.

Application filed July 12, 1911. Serial No. 638,051.

*To all whom it may concern:*

Be it known that I, MATTHEW S. BATCHELDER, a citizen of the United States, residing at Fond du Lac, in the county of Fond du Lac and State of Wisconsin, have invented certain new and useful Improvements in Cow-Stalls, of which the following is a specification, reference being had to the accompanying drawing, forming a part thereof.

The main objects of this invention are to so confine cows, especially milch cows, that they cannot soil themselves with their own dung or excrement, and thus keep them in such a cleanly condition that they can be milked without contamination of their milk with particles of dung which under ordinary stable conditions it is extremely difficult to prevent from sticking and drying to the hair and being brushed therefrom in milking, into the milk pails; to avoid the necessity of tying or fastening them in the usual way by the necks with chains or stanchions, and thereby to promote their ease and comfort, which is an important consideration in the care of milch cows, materially affecting their production of milk; and generally to improve the means for stabling cattle, particularly milch cows.

It consists in the construction, arrangement and combination of parts as hereinafter particularly described and defined in the claims.

In the accompanying drawing like characters designate the same parts in the several figures.

Figure 1 is a vertical longitudinal section on the line 1 1, Fig. 2, through one of a series of stalls embodying the invention; Fig. 2 is a vertical cross section on the line 2 2, Fig. 1, showing a stall and parts of two adjoining stalls; Fig. 3 is a horizontal section on the line 3 3, Fig. 1, showing in plan view a gate at the rear end of one of the stalls and parts of the gates of adjoining stalls in closed position; and Fig. 4 is an enlarged cross section on the line 4 4, Fig. 1, showing the pivot connection of the gates of adjoining stalls with the rear side upright between the stalls.

Stalls constructed in accordance with the present invention are arranged as usual in common practice, in series, side by side. They may be conveniently built with a frame work of gas or other metal piping comprising uprights $a$ at the front of the stalls connected at their upper ends by a stringer or cross member $b$, side uprights $c$ between the several stalls and longitudinal members $d$ connecting the uprights $c$ with the stringer or cross member $b$. The several members of the frame work are connected with one another by standard pipe fittings such as T's $e$.

The uprights $a$ and $c$ are set at their lower ends into the cement or concrete floor $f$ with which the stable is provided and which is formed along the rear ends of the stalls with a gutter $g$. The side uprights $c$ which may extend as shown in Fig. 1, from the floor to the ceiling of the stable, are fastened at their upper ends by socket plates $h$ to a beam $i$, or any other convenient part of the frame work of the building. They are located at a sufficient distance from the gutter to allow for easy access to the udders of cows confined in the stalls, for milking.

A manger or series of mangers $j$ extends along the front of the stalls, as shown in Fig. 1.

The stalls are provided at their front ends with barriers to confine the cows therein and prevent their stepping forward with their front feet into the manger $j$. These barriers consist of divided breast rails which may be constructed as shown, of pipe sections $k$, which are bent into oval form and welded together at the ends and which are bolted or otherwise fastened to the uprights $a$, each section forming parts of the breast rail of adjoining stalls.

The stalls are closed or partially closed at the sides by coarsely woven wire panels $l$, inclosed in metal frames and bolted or otherwise fastened to the uprights $c$, top members $d$ and breast rails $k$. These panels preferably terminate on the lower side as shown, some distance above the floor.

At their rear ends the stalls are provided with vertically swinging bail-shaped gates $m$, which are pivotally connected by metal collars or clips $n$ with the uprights $c$, so that when they are lowered into the position shown by full lines in Figs. 1, 2 and 3, they will coöperate with the breast rails $k$ to confine the cows in the stalls and limit their movement lengthwise thereof, as indicated in Fig. 1.

Each gate is connected with the uprights $c$ above it by a jointed brace $o$ on one side, and a chain $p$ on the opposite side of the stall. The jointed brace $o$ composed of pivotally connected sections is so constructed and arranged that when it is extended as shown by full lines in Fig. 1, it will lock and hold the gate m in its lower or closed position, and when the gate is swung upwardly into its open position as indicated by dotted lines in Fig. 1, it will tend to retain it in that position, so that a cow can freely enter or leave the stall. The chain p supports the gate in its lower or closed position on the opposite side of the stall.

Adjacent ends of the gates of adjoining stalls are pivoted in and connected by the same collar or clip n, with the upright c between said stalls, as shown in Figs. 3 and 4.

The gates m and the braces o may be conveniently constructed as shown, of metal bands which are disposed vertically edgewise when the gates are closed, so that they present little or no surface for dung to lodge upon. The gates so constructed are at the same time, light, strong and durable.

The divided breast rails k and the gates m constructed and arranged as shown and described with relation to the stalls and the gutter g, so limit the movement of the cows lengthwise in the stalls without causing them discomfort, that they cannot step backward into the gutter or forward far enough to drop dung on the floor in front of the gutter and thus soil themselves when they lie down. At the same time, they are allowed freedom of movement sidewise in the stalls and in lying down and getting up, and their ease and comfort being thus promoted, tend to increase their production of milk.

Various modifications in the details of construction and arrangement of parts of the stall may be made without departure from the principle of the invention.

I claim:

1. In a cow stall the combination of uprights at the sides of the stall, a bail-shaped gate pivoted at its ends to said uprights, and a jointed brace connecting said gate with one of said uprights and adapted to hold the gate when lowered in position to confine a cow in the stall.

2. In a cow stall the combination of uprights at the sides of the stall, a bail-shaped gate pivoted at its ends to said uprights so as to be swung vertically into and out of operative position, a jointed brace connecting the gate on one side with one of said uprights, and a chain connecting the gate on the other side with the other upright, said brace and chain being adapted to support and hold the gate when lowered in position to confine a cow in the stall.

3. In a cow stall, the combination with the sides of the stall, of a vertically swinging bail-shaped gate pivoted to the sides of the stall so as to be turned up to admit a cow into the stall and turned down to confine her therein, and a divided breast rail fastened to the sides of the stall at the front end thereof.

4. In a cow stall the combination with the sides and floor of the stall and a gutter extending across the rear end and below the level of the floor at some distance from the sides, of a bail-shaped gate pivoted at the ends to the sides so as to be swung up to allow a cow to enter the stall and swung down to confine her therein, and a breast rail consisting of sections fastened to the sides of the stall and projecting inwardly therefrom toward each other, said gate and breast rail coöperating to limit the movement of the cow lengthwise of the stall without otherwise fastening her.

5. In a cow stall the combination with a floor having a gutter at the rear end thereof, and a frame work of metal piping comprising uprights at the front of the stall connected at their upper ends by a cross member, uprights at the sides of the stall at some distance from the gutter and longitudinal side members connecting said side uprights with said cross member; a divided breast rail consisting of oval pipe sections fastened to the front uprights and extending inwardly therefrom toward each other, and a bail-shaped gate pivoted to the side uprights and adapted in conjunction with said breast rail to confine a cow in the stall and to limit her movement lengthwise thereof.

In witness whereof I hereto affix my signature in presence of two witnesses.

MATTHEW S. BATCHELDER.

Witnesses:
S. D. BOREHAM,
DON RUSSELL.

---

Copies of this patent may be obtained for five cents each, by addressing the "Commissioner of Patents, Washington, D. C."